(12) United States Patent
Mazloum et al.

(10) Patent No.: US 11,218,989 B2
(45) Date of Patent: Jan. 4, 2022

(54) PAGING MECHANISM IN RADIO NETWORK WITH MULTIPLE BEAM OPERATION

(71) Applicant: SONY CORPORATION, Tokyo (JP)

(72) Inventors: Nafiseh Mazloum, Lund (SE); Basuki Priyanto, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 27 days.

(21) Appl. No.: 16/958,303

(22) PCT Filed: Jan. 28, 2019

(86) PCT No.: PCT/SE2019/050055
§ 371 (c)(1),
(2) Date: Jun. 26, 2020

(87) PCT Pub. No.: WO2019/160466
PCT Pub. Date: Aug. 22, 2019

(65) Prior Publication Data
US 2021/0037499 A1    Feb. 4, 2021

(30) Foreign Application Priority Data

Feb. 15, 2018  (SE) ................................. 1850162-7

(51) Int. Cl.
*H04W 68/00*    (2009.01)
*H04W 76/28*    (2018.01)
(Continued)

(52) U.S. Cl.
CPC .......... *H04W 68/005* (2013.01); *H04W 8/24* (2013.01); *H04W 56/001* (2013.01);
(Continued)

(58) Field of Classification Search
CPC ... H04W 68/005; H04W 76/28; H04W 76/11; H04W 8/24; H04W 56/001; H04W 72/042; H04W 72/046
(Continued)

(56) References Cited

U.S. PATENT DOCUMENTS 9,282,586 B2 * 3/2016 Son ...................... H04W 60/00
2014/0221023 A1 * 8/2014 Maggenti ............ H04L 65/1016
455/458
(Continued)

OTHER PUBLICATIONS

Swedish Search Report and Office Action from corresponding Swedish Application No. 1850162-7, dated Oct. 31, 2018, 8 pages.
(Continued)

*Primary Examiner* — Nghi H Ly
(74) *Attorney, Agent, or Firm* — Tucker Ellis LLP

(57) ABSTRACT

A method for paging in a wireless communication system, including a network node (10) configured to send and receive data in a plurality of beams for communication with a terminal (1), comprising transmitting first paging data (20) including a paging indicator from the network node (10) in multiple beams, wherein the paging indicator includes terminal ID or group ID information and a feedback request indicator and; receiving a response signal (22) in the network node from the terminal, wherein, dependent on said feedback request indicator, the response signal includes a beam indicator associated with a detected beam in which the terminal has received data from the network node.

20 Claims, 3 Drawing Sheets

(51) Int. Cl.
*H04W 76/11* (2018.01)
*H04W 8/24* (2009.01)
*H04W 56/00* (2009.01)
*H04W 72/04* (2009.01)

(52) U.S. Cl.
CPC ....... *H04W 72/042* (2013.01); *H04W 72/046* (2013.01); *H04W 76/11* (2018.02); *H04W 76/28* (2018.02)

(58) Field of Classification Search
USPC ................ 370/379, 328, 338, 341, 345, 350
See application file for complete search history.

(56) References Cited

U.S. PATENT DOCUMENTS

| | | | | |
|---|---|---|---|---|
| 2015/0230203 A1* | 8/2015 | Diachina | ............... | H04W 68/02 370/329 |
| 2015/0237592 A1* | 8/2015 | Kim | ...................... | H04W 68/02 455/435.1 |
| 2017/0366236 A1 | 12/2017 | Ryoo et al. | | |
| 2017/0367069 A1 | 12/2017 | Agiwal et al. | | |
| 2018/0027522 A1 | 1/2018 | Lee et al. | | |

OTHER PUBLICATIONS

International Search Report and Written Opinion from corresponding International Application No. PCT/SE2019/050055, dated Mar. 21, 2019, 13 pages.
MediaTek Inc, "Paging in NR with Beam Sweeping," 3GPP TSG RAN WG2#97, R2-170xxxx, Feb. 3, 2017, 4 pages.
XiaoMi Communications, "Considerations on paging design," 3GPP TSG RAN WG1#88, R1-1703230, Feb. 12, 2017, 2 pages.
LG Electronics, "Paging design in NR", 3GPP TSG RAN WG1 Meeting #Adhoc1801, R1-1800353, Jan. 13, 2018, 3 pages.

* cited by examiner

PAGING MECHANISM IN RADIO NETWORK WITH MULTIPLE BEAM OPERATION

TECHNICAL FIELD

This disclosure relates to methods and devices in a radio communication system, comprising a radio access network and a wireless terminal. Specifically, solutions are provided which relate to a paging mechanism using beamforming in a network node.

BACKGROUND

In radio communication systems, such as various generations provided through the 3rd Generation Partnership Project (3GPP), various specifications have been provided for setting up common rules for setting up and operating both a wireless radio interface between a wireless terminal and a network node, and various levels of operation of the network. In 3GPP documentation, a terminal is commonly referred to as a User Equipment (UE), but will generally be referred to herein as a terminal. Such terminals are connectable to a core network by means of a radio access network RAN, which includes one or more network nodes, operative to provide radio access to terminals within a cell. Such network nodes network node may also be referred to as an access node or a base station, and various terms are used in 3GPP for different types of systems or specifications. In the so-called 4G specifications, also referred to as Long-Term Evolution (LTE), the term eNodeB (eNB) is used to denote a network node.

After successful implementation and use of the 4G communication system, efforts to develop an improved 5G communication system or a pre-5G communication system have been conducted. For this reason, the 5G communication system or the pre-5G communication system is called a communication system beyond 4G network, and also New Radio (NR). A network node configured to operate in a 5G radio access network may be denoted a gNB.

To achieve a high data transmission rate, the 5G communication system is intended to be implemented in a super high frequency (mmWave) band (e.g., like 28 GHz band). To alleviate a path loss of a radio wave and increase a transfer distance of the radio wave in the super high frequency band, in the 5G communication system, beamforming, massive MIMO, full dimensional MIMO (FD-MIMO), array antenna, analog beam forming, digital beam forming, hybrid beam forming, and large scale antenna technologies have been discussed.

The 5G technology defines an energy-efficient operation to achieve the main goal of improving power efficiency of terminal and network node networks. For this purpose, in order to solve the possibility of additional power consumption due to a beamforming transmission method, which is indispensable in operation of a high frequency band, control discussions have been started to reduce a measurement operation and an activation operation time of the corresponding cell.

A first release of 5G New Radio (NR) was approved in 3GPP RAN Plenary #78 in December of 2017. 5G NR offers higher capacity and higher peak data rate than any predecessor systems, such as 4G LTE. This can be achieved by the operation of multiple narrow beams at both terminal (UE) and network node (gNB). The operation of single beam (e.g. omni directional) transmission in LTE makes the paging mechanism in LTE quite straightforward. During the paging occasion (PO), when the eNB acts to transmit a paging message to a terminal, the scheduled terminal is expected to receive the message. However, in 5G NR with multiple narrow beam operation, the gNB needs to transmit paging information in all possible beam direction. This is typically done by performing beam sweeping as the gNB does not know the best transmit (Tx) beam to the intended terminal. This operation leads to an extra overhead resulting in waste of resources and requires higher processing power at the UE side.

In discussions related to possible paging mechanism for 5G NR, a number of options for paging mechanism have been considered.

Option 1: Paging DCI followed by Paging Message, though not necessarily consecutively.

Option 2: Paging group indicator triggering UE feedback and Paging DCI followed by Paging Message.

Option 3: Paging group indicator and Paging DCI in one transmission followed by Paging Message Option 4: Paging DCI indicates use of Option 1 or 2.

Option 1 means the concept of paging transmission in LTE is reused in 5G NR. The option 1 operation ensures that the paging mechanism works in NR and at least as reliable as in LTE. However, it, in addition to introducing an extra latency, this requires a lot of network resources and sacrifices terminal battery/energy resources. Option 2 requires all UEs to always provide feedback which could increase UE power consumption. Option 3 may require extra overhead for the multiple transmissions of paging indicator, DCI, and message.

SUMMARY

To address the above-discussed deficiencies, it is a primary object to provide a method for reducing power waste and excessive signaling at paging.

According to a first aspect, a method is provided for paging in a wireless communication system, including a network node configured to send and receive data in a plurality of beams for communication with a terminal, comprising transmitting first paging data including a paging indicator from the network node in multiple beams, wherein the paging indicator includes terminal ID or group ID information and a feedback request indicator and;

receiving a response signal in the network node from the terminal, wherein, dependent on said feedback request indicator, the response signal includes a beam indicator associated with a detected beam in which the terminal has received data from the network node.

In one embodiment, the method comprises transmitting second paging data, including downlink control information associated with a paging message, from the network node to the terminal, wherein, responsive to receiving a beam indicator in the response signal, the second paging data is transmitted in a beam determined by the beam indicator.

In one embodiment, said beam indicator is associated with a detected beam in which the terminal received the first paging data.

In one embodiment, said beam indicator is associated with a detected beam in which the terminal has received a multibeam sync signal.

In one embodiment, second paging data is transmitted in a dedicated beam determined by the received beam indicator.

In one embodiment, the feedback request indicator is determined based on a network load indicator.

In one embodiment, the method comprises receiving a message from the terminal, which message includes data indicating capability of the terminal to support beam reporting during paging.

In one embodiment, the response signal is received in a resource dedicated to the detected beam.

In one embodiment, the first paging data includes a wake-up signal for the terminal.

In one embodiment, the method comprises transmitting the first paging transmission at an instant determined based on at least one of terminal ID, duration of a DRX cycle, and a paging frame number.

In one embodiment, said transmission in multiple beams is frequency division multiplexed FDM, wherein said first paging data is transmitted in a predetermined frequency index number associated with the terminal.

In one embodiment, said transmission in multiple beams is carried out in a beam sweep mode.

According to a second aspect, a network node configured for communication with a terminal in a wireless communication system is provided, the network node comprising a transceiver configured to send and receive data in a plurality of beams, and a control unit including a processing device and a data memory holding computer program code, wherein the processing device is configured to execute the computer program code so that the control unit is configured to control the network node to transmitting first paging data in multiple beams, said paging data including a paging indicator associated with a terminal, wherein the paging indicator includes a feedback request indicator;

receive a response signal from the terminal, wherein, dependent on said feedback request indicator, the response signal includes a beam indicator associated with at least one beam in which the terminal has received data from the network node.

In one embodiment, the network node is configured to carry out any of the preceding method steps.

According to a third aspect, a method is provided for paging in a wireless communication system, including a network node configured to send and receive radio signals in a plurality of beams for communication with a terminal, comprising receiving first paging data in the terminal, the first paging data including a paging indicator transmitted in multiple beams from the network node;

determining a feedback request indicator in the received first paging data;

transmitting a response signal from the terminal to the network node including, dependent on said feedback request indicator, a beam indicator associated with a beam in which the terminal has received data from the network node.

In one embodiment, the method comprises determining a beam indicator based on the received first paging signal.

In one embodiment, the method comprises receiving second paging data, including downlink control information associated with a paging message, from the network node to the terminal, wherein, responsive to sending a beam indicator in the response signal, the second paging data is received in a dedicated beam associated with said beam indicator.

In one embodiment, the method comprises determining presence of a terminal ID or a group ID associated with a group of terminals, associated with the terminal, in the first paging data, wherein the step of sending a response signal is carried out responsive an ID of the terminal being received in the first paging data.

According to a fourth aspect, a terminal is provided, configured for communication with a network node, which network node is configured to send and receive data in a plurality of beams in a wireless communication system, the terminal comprising a transceiver, and a control unit including a processing device and a data memory holding computer program code, wherein the processing device is configured to execute the computer program code so that the control unit is configured to control the terminal to receive first paging data, the first paging data including a paging indicator transmitted in multiple beams from the network node;

determine a feedback request indicator in the received first paging data;

transmit a response signal from the terminal to the network node including, dependent on said feedback request indicator, a beam indicator associated with at least one beam in which the terminal has received data from said network node.

In various embodiments, the terminal may be configured to carry out any of the preceding method steps.

BRIEF DESCRIPTION OF THE DRAWINGS

Various embodiments will be described with reference to the drawings, in which.

DETAILED DESCRIPTION

Figure 1:
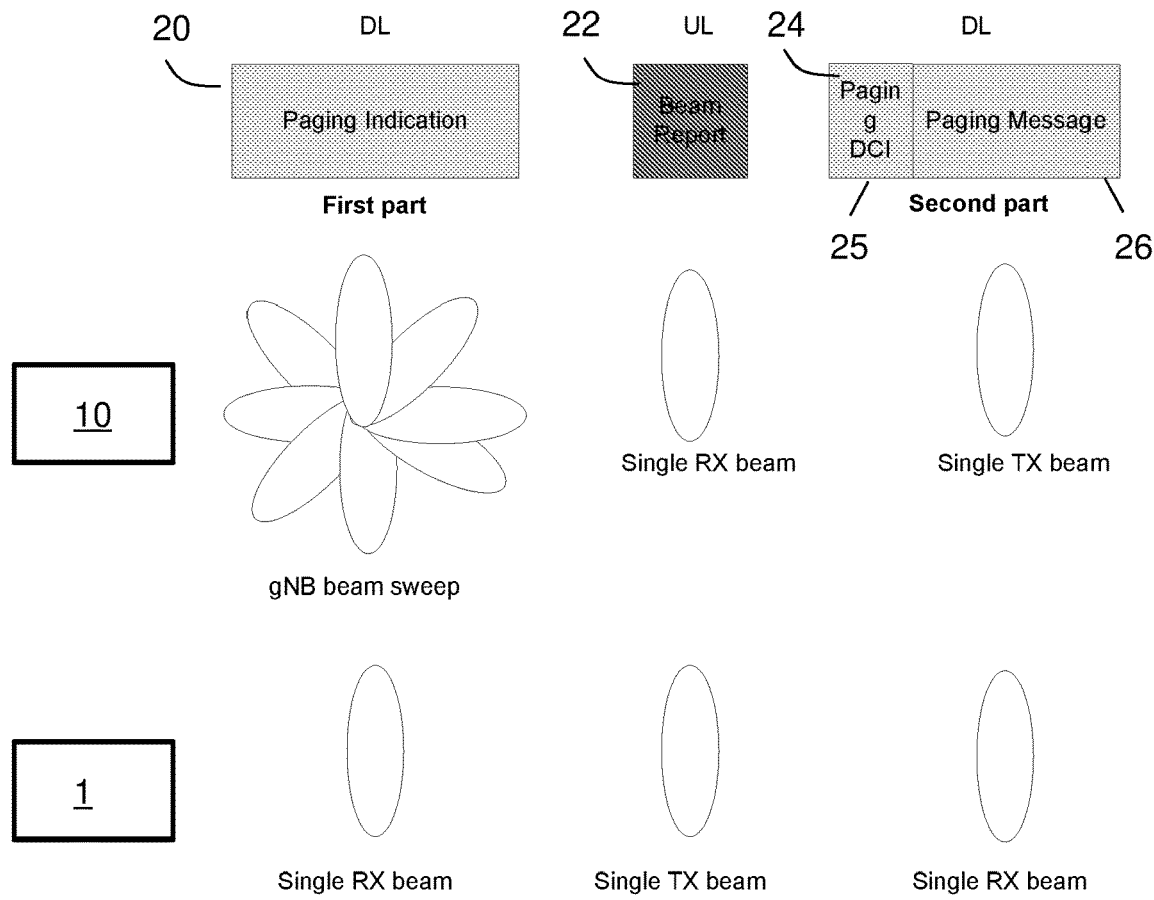
FIG. 1 illustrates a two-step paging mechanism between a network node and a terminal according to various embodiments.

The invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

Various embodiments are outlined herein, generally suitable for employment in a 5G 3GPP radio communication system, but any type of radio communication system including network nodes capable of both transmission in multiple beams and dedicated beam transmission may be configured to implement the solutions provided herein. For this reason, the term terminal will generally be used to denote a wireless device connectable by e.g. radio communication with an access network, and the term network node will be used to denote a node of the access network configured to provide wireless access to terminals.

In broad terms, solutions are provided for a paging mechanism in the presence of multiple beam operation, with the main purpose to shorten latency and providing efficient terminal power consumption also reducing network overhead.

In general terms, paging is a mechanism that may be carried out in the downlink (DL) or the uplink (UL), dependent on whether the network or the terminal initiates communication for sending a paging message. The conventional approach may include the general blocks of SYNC-PAGING-RANDOM ACCESS PROCEDURE-Terminal in CONNECTED MODE.

According to various embodiments, the paging mechanism from the network node is divided into two parts, where the first part may contain at least a feedback request indicator. This feedback request indicator may include, or be determined by, e.g. a network load indication or a priority level for a terminal or group of terminals. The feedback request indicator may be optional, in the sense that it need not always be included. In one embodiment, a method is operated in the network node 10, including determining network load, and including a feedback request indicator based on the network load. As an example, the feedback request indicator is included if the determined network load exceeds a load threshold, as specified or calculated.

Dependent on the feedback request indicator, a terminal may be configured to provide beam reporting, i.e. to indicate the best downlink beam. Some terminals may not support beam reporting, mainly due to hardware constraint and/or power consumption constraints. Thus, the terminal can indicate its capability to support beam reporting during paging. It can be implicit signaling and derived based on the existing signaling/UE type. It can also be based on explicit signaling using a new dedicated higher layer signaling (RRC) where the UE specifically informs its beam reporting capability during paging transmission. The transmission direction of the paging second part will be based on the terminal beam report, by selecting transmission in a dedicated beam. Thus, the need of beam sweeping can be avoided for transmission of the second part, which carried more payload than the first part.

FIG. 1 schematically illustrates an embodiment of the proposed paging mechanism, where a network node 10 is configured to operate both by transmission in a plurality of different beams, and by transmitting in a selected dedicated beam. Paging is related to a recipient terminal 1, which may also be configured to operate with beamforming, or only with omni-directional transmission. In a first part of the paging mechanism, paging in the DL involves transmitting first paging data 20 in multiple beams, such as all of said plurality of beams, including a paging indicator from the network node 10. The size of paging data 20 is relatively small (for example in the order of some hundred bits). It can be based on a sequence signal and the information is masked in combination with the sequence signal. The sequence signal can be PN sequence, zadoff-chu sequence, or any combination. This step is carried out by transmission in multiple beams since the network node 10 is unaware of the location of or direction to the terminal 1. Transmission in multiple beams may be carried out by so-called beam sweeping, an operation of covering a spatial area, with beams transmitted and/or received during a time interval in a predefined way. Since the first paging size is small, it is not a burden in term of resources size for the base-station to perform beam-sweeping. In 5G, beam sweeping is introduced, and related operation is at least partly provided for in 3GPP specifications, such as in TS 38.201 v15, TS 38.213 v15. In the first part, the transmitted first paging data 20 includes a paging indicator. The paging indicator contains or indicates a terminal or a group ID for a group of terminals, associated with the terminal 1 intended to be paged, and preferably also a broadcast indicator. Due to the size constraint, the terminal ID in the first paging may not be a complete terminal ID (e.g. IMSI). It can be in a form of temporary terminal ID which associated to IMSI. Furthermore, the paging indicator includes a feedback request indicator, which may include or be associated with a determined network load indicator. The paging indicator may also be initiated with a Wake Up Signal (WUS) in case the system supports WUS operation. As such, the WUS may form part of the first paging data 20, or precede the first part paging data 20.

In various embodiments, the occasion for the paging first part transmission can be calculated based on legacy parameters such as UE ID (IMSI), DRX cycle length, paging frame.

Figure 2:
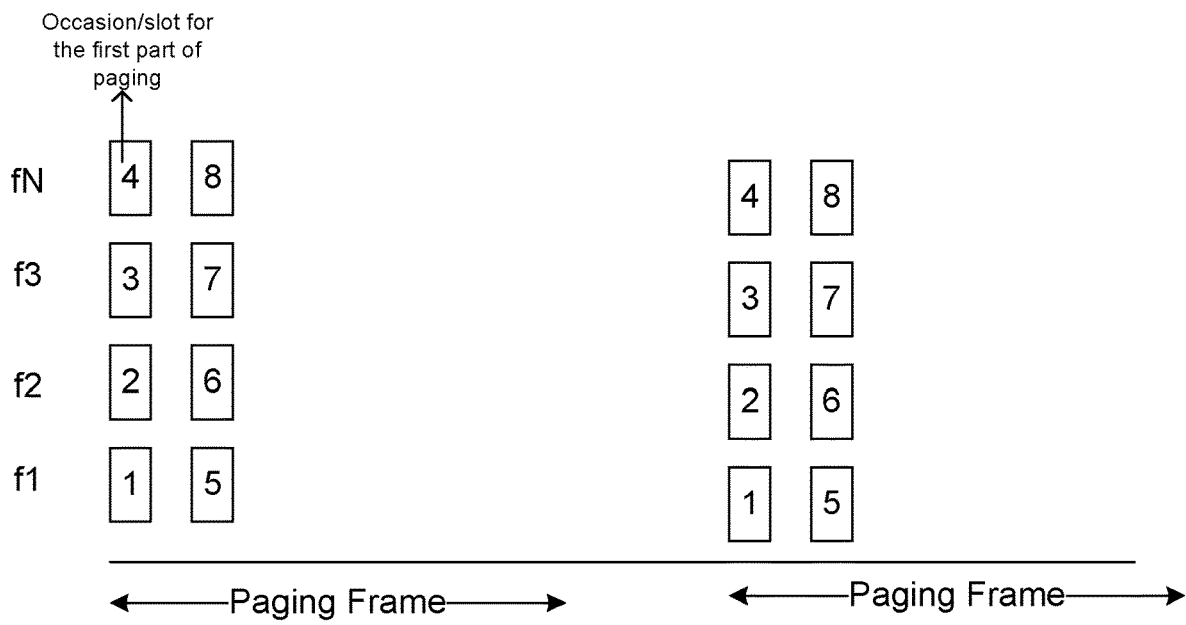
FIG. 2 schematically illustrates using multiple resources in frequency division multiplex for paging according to various embodiments.

FIG. 2 illustrates an embodiment, in which transmission of the first paging data 20, i.e. in the first part of the paging mechanism, is executed on several frequencies by frequency division multiplexing (FDM) by the network node 1. This way, the terminals in the cell of network node 1, including the terminal 1, can make use of the availability of multiple resources in frequency domain when listening for possible paging. This way, better use of the capability of terminals in e.g. a 5G system is provided.

Referring back to FIG. 1, the first part of the paging transmission, mentioned above, is transmitted in multiple possible beam directions (such as beam sweeping operation) to cover all intended spatial areas. This transmission may e.g. be performed based on any of the following options:

a. TDM (time division multiplex) operation between a synchronization signal block (SSB) transmission from the network node 10 and the first paging transmission of the first paging data 20. In such an embodiment, there may be a mapping procedure, e.g. one-to-one mapping, between SSB beam and the first part of paging transmission beam during the beam sweep. TDM operation is typically suitable for supporting terminals with limited bandwidth BW (e.g. The UE supported bandwidth is equal to the bandwidth of the SSB transmission).

b. FDM operation between SSB transmission and the first paging transmission. In such an embodiment, there may be a mapping procedure, e.g. one-to-one mapping) between SSB beam and the first part of paging transmission beam during the beam sweep. This option may require wider bandwidth since the transmission needs to accommodate both SSB and the first paging transmission at the same time but at different frequency.

c. The number of beams for the first part of paging transmission is targeted to be the same number as the actual transmitted SSB beams.

d. The first paging data 20 of the first part of paging transmission is transmitted independently, i.e. regardless of the SSB transmission. This mechanism may particularly be employed where the first part contains WUS, and the terminal does not have to detect SSB prior to the WUS reception.

Figure 3:
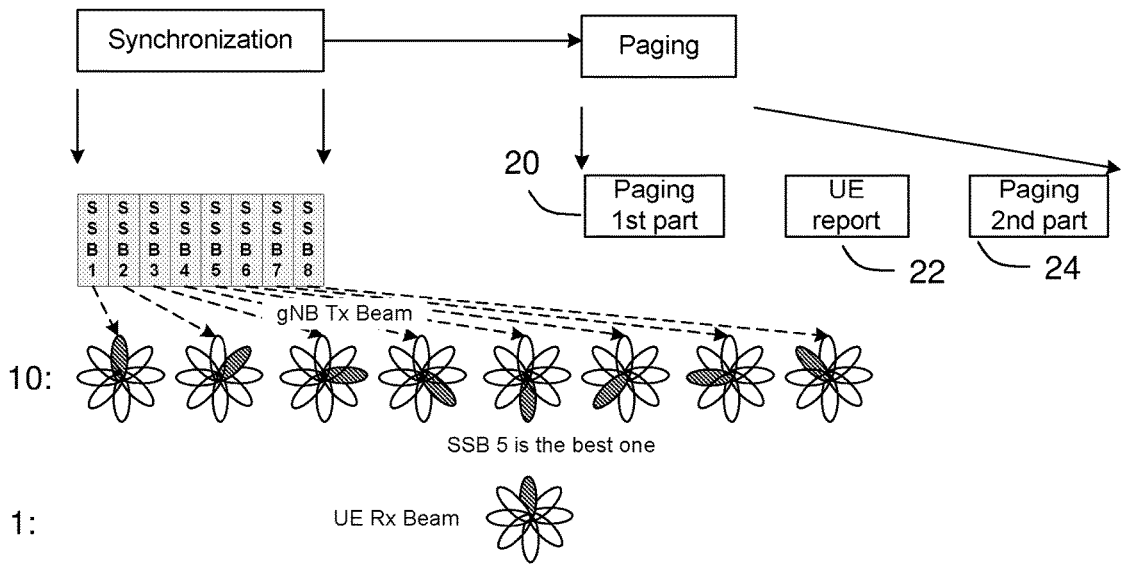
FIG. 3 schematically illustrates a paging mechanism according to various embodiments.

FIG. 3 schematically illustrates a paging mechanism according to various embodiments. The actual paging is typically preceded with a synchronization phase, in which synchronization signals are transmitted in several beams, where each beam may be identifiable by the associated synchronization signal sent from the network node 10, such as SSB. In the paging mechanism, first paging data 20, including a paging indicator transmitted from the network node 10, may be received in the terminal 1 to be paged. Thereby, the terminal 1 operates a control unit to determine the presence of a feedback request indicator in the received first paging data, if included. If there is no feedback request indicator, or if feedback request indicator does not indicate need for a feedback, such as a flag equal to zero "0", further operation of the paging mechanism may proceed according to legacy or any other suggested process. However, if a feedback request indicator is detected, or e.g. if a specific a feedback request indicator equals to one "1", the terminal may be configured to include a beam report in a response to the network node 10. The paging mechanism may thus include transmitting a response signal 22 from the terminal 1 to the network node 10 including, dependent on said feedback request indicator, a beam indicator associated with a beam, such as beam No. 5 in FIG. 3, in which the terminal has received data from the network node 10. In one embodiment, said beam indicator may be associated with a detected beam in which the terminal received the first paging data 20. In another embodiment, said beam indicator may be associated with a detected beam in which the terminal 1 has received a previously transmitted multi-beam synchronization signal from the network node 10, such as SSB.

The response signal 22 may be received in the network node 10, wherein, dependent on said feedback request indicator, the response signal may include said beam indicator associated with a detected beam in which the terminal 1 has received data from the network node 10.

Figure 4:
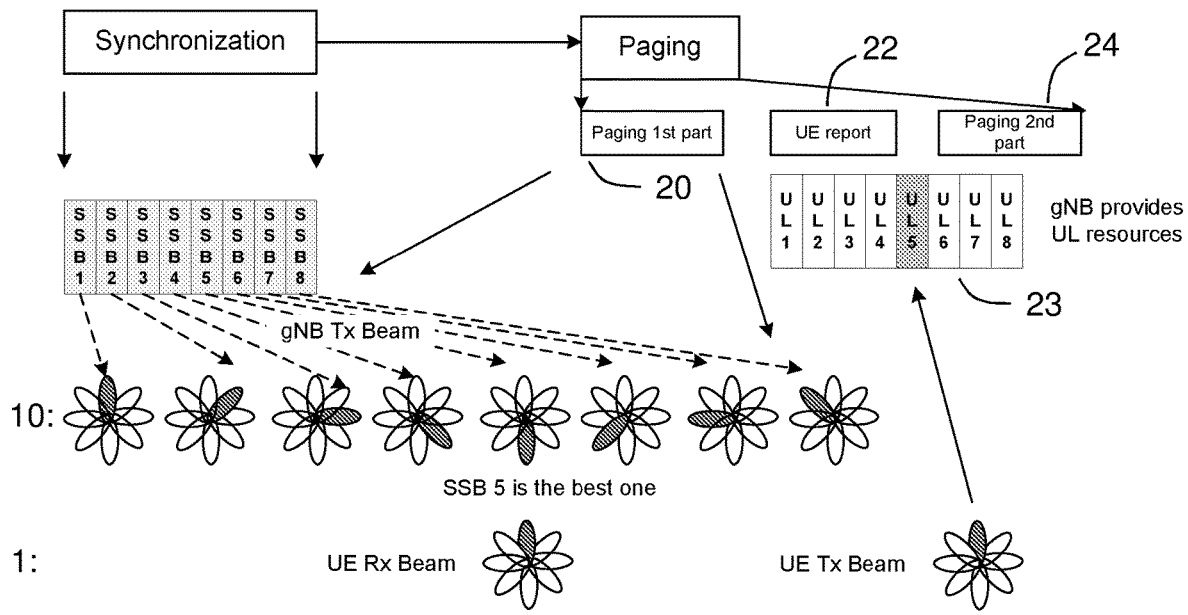
FIG. 4 schematically illustrates a paging mechanism according to various embodiments using an uplink resource for implicitly indicating a detected beam.

FIG. 4 schematically illustrates an embodiment, which may be seen as a special version of the embodiment of FIG. 3. In this embodiment, the response signal 22 is received in a resource dedicated to the detected beam. In this sense, a specific uplink resource may be used for conveying an ID of the detected beam, typically the best beam, such as beam No. 5 in FIG. 4. In the shown exemplary embodiment, usable for understanding this concept, the SSBs and/or first paging data is transmitted from the network node 10 in 8 beams. The network node 10 may thus allocate 8 different resources 23. If the terminal identifies beam no. 5 as the best downlink beam from the network node, or only, detected beam, then the terminal 1 is configured to transmit the beam report as a response signal 22 using the uplink resource allocated no. 5. The uplink resources to accommodate possible multiple beams can be allocated in TDM and/or FDM. Thus, when the network node 10 receives a signal in resource 23 associated with beam no. 5, the network node 10 is implicitly informed that for communication with that terminal 1 it is best to use beam no. 5.

The paging mechanism may proceed by transmitting second paging data 24, including downlink control information DCI 25 associated with a paging message, from the network node 10 to the terminal 1. Paging DCI or paging Downlink Control Information may contain the resource allocation address of the paging message, modulation and coding scheme of the paging message. Paging message may contain the terminal ID if the first part contains the group ID. Responsive to receiving a beam indicator in the response signal 22, the network node 10 may be configured to transmit the second paging data 24 in a beam determined by the received beam indicator. The second part of paging transmission may include both DCI 25 and a paging message 26. The DCI may thus contain the paging message configuration and/or its scheduling. The size of the second paging data 24 can be further reduced by making the configuration static/semi-static.

Dependent on the network load status, as noted, the paging mechanism may involve different steps. In an exemplary embodiment, this may entail:

At high network load: prior to the reception of the second paging transmission, i.e. the second paging data 24, a terminal 1 is configured to transmit a beam report, indicating the best beam detected by the terminal 1. The best beam detection at the UE can be considered as a UE implementation aspect. It can be based on the measurement of the received SSBs and/or the received first paging. The network node 10 directly transmits the second paging data 24 only on the selected beam direction based on the beam information reported by the terminal 1. This operation avoids any beam sweeping operation. Thus, minimize the overhead and reduce the delay.

At low network load: the second paging data 24 is transmitted in multiple beam directions and the terminal 1 is not required to transmit the beam report. This may be accomplished by either not including the request feedback indicator in the first paging data 20 or providing a request feedback indicator that indicates to the terminal 1 not to respond with a beam report.

Preferably, a terminal 1 is configured to indicate in case it does not support beam reporting during paging mechanism. This reporting is preferably carried out separate from the paging mechanism and may be accomplished by a single report, e.g. when attaching to the network. In one embodiment, the network may also be configured to group this type of terminals in a dedicated group of terminals.

Figure 5:
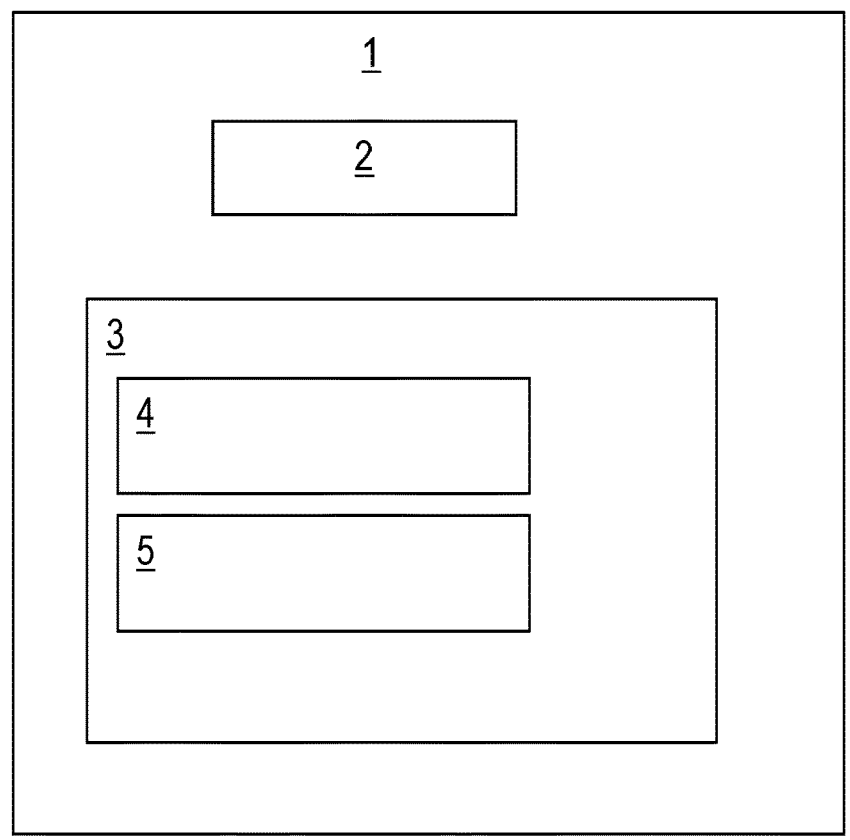
FIG. 5 schematically illustrates elements included in a network node configured in accordance with various embodiments.

FIG. 5 schematically illustrates a terminal 1 for use in a radio communication system as presented herein. The terminal 1 may e.g. be a mobile phone or other type of user device for radio communication, or a component included in such a device. Alternatively, the terminal 1 may be configured as a machine to machine type device, such an Internet of Things, IoT, device, or similar Obviously, the terminal may include other features and elements than those shown in the drawing or described herein, such as at least one antenna, power supply, user interface etc.

The terminal 1 may be configured for communication with a network node 10 of e.g. a radio access network RAN, and comprise a transceiver 2, such as a radio receiver and transmitter for communicating with the network node 10 through at least an air interface. The terminal 1 further comprises a control unit 3 including a data memory 4, such as a non-volatile memory, holding computer program code, and a processing device 5, such as a microprocessor. The processing device 5 is thereby configured to execute the computer program code from the memory 4, wherein the control unit 3 is configured to control the terminal 1 to receive first paging data 20, the first paging data 20 including a paging indicator transmitted in multiple beams from the network node 10;

determine a feedback request indicator in the received first paging data 20;

transmit a response signal 22 from the terminal 1 to the network node 10 including, dependent on said feedback request indicator, a beam indicator associated with at least one beam in which the terminal 1 has received data from said network node 10, e.g. the first paging data 20 or SSB.

The terminal 1 may otherwise be configured to carry out any of the method steps as provided herein.

Figure 6:
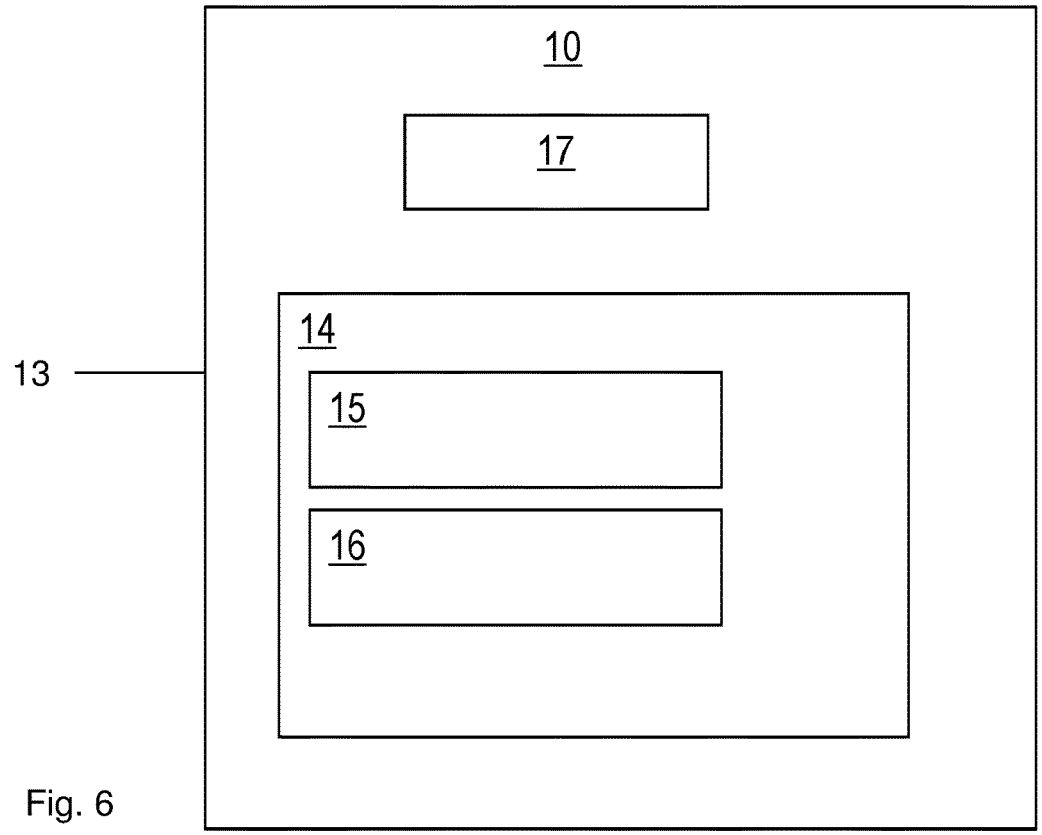
FIG. 6 schematically illustrates elements included in a terminal configured in accordance with various embodiments.

FIG. 6 schematically illustrates a network node 10 for use in a radio communication system as presented herein. As noted, the network node 10 may e.g. be a gNB access node of a 3GPP 5G network or other. The network node 10 thus forms part of a radio access network RAN, preferably having an interface 13 to a core network 110. The network node 10 comprises at least a wireless interface 17 for terminal communication by radio, which transceiver is configured to send and receive data in a plurality of beams. The network node further includes a control unit 14 including a data memory 15, such as a non-volatile memory, holding computer program code, and a processing device 16, e.g. one or more microprocessors, configured to execute the computer program code. The control unit 14 is thereby configured to control the network node 10 to transmit first paging data 20 in multiple beams, said paging data including a paging indicator associated with a terminal 1, wherein the paging indicator includes a feedback request indicator;

receive a response signal 22 from the terminal 1, wherein, dependent on said feedback request indicator, the response signal 22 includes a beam indicator associated with at least one beam in which the terminal has received data from the network node.

In various embodiments, the control unit 14 may be configured to control the network node 10 to transmit second paging data, including downlink control information associated with a paging message, from the network node to the terminal, wherein, responsive to receiving a beam indicator in the response signal, the second paging data is transmitted in a beam determined by the beam indicator.

Various embodiments have been disclosed herein by way of example, to illustrate various ways of realizing methods and devices falling within the terms of the claims. Unless where specifically noted, these embodiments, or features related to those embodiments, may be combined.

The invention claimed is:

1. Method for paging in a wireless communication system, including a network node configured to send and receive radio signals in a plurality of beams for communication with a terminal, comprising
   receiving first paging data at the terminal, the first paging data including a paging indicator transmitted in multiple beams from the network node, wherein the paging indicator includes a feedback request indicator; and
   transmitting a response signal from the terminal to the network node including, dependent on said feedback request indicator, a beam indicator associated with a beam in which the terminal has received data or a signal from the network node;
   receiving second paging data, including downlink control information associated with a paging message, from the network node to the terminal; wherein, responsive to sending a beam indicator in the response signal, the second paging data is received in a dedicated beam associated with said beam indicator.

2. The method of claim 1, comprising
   determining a beam indicator based on the received first paging signal.

3. The method of claim 1, comprising
   determining a beam indicator based on a received synchronization signal transmitted in multiple beams by the network node.

4. The method of claim 1, comprising
   determining presence of terminal identification information in the first paging data,
   wherein the step of sending a response signal is carried out responsive terminal identification information associated with an ID of the terminal being received in the first paging data.

5. The method of claim 4, wherein said terminal identification information is associated with a terminal ID or a group ID.

6. The method of claim 1, wherein the first paging data includes a wake-up signal for the terminal.

7. Method for paging in a wireless communication system, including a network node configured to send and receive data in a plurality of beams for communication with a terminal, comprising
   transmitting first paging data including a paging indicator in multiple beams from the network node, wherein the paging indicator includes terminal identification information and a feedback request indicator; and
   receiving a response signal at the network node from the terminal, wherein, dependent on said feedback request indicator, the response signal includes a beam indicator associated with a detected beam in which the terminal has received data or a signal from the network node;

transmitting second paging data, including downlink control information associated with a paging message, from the network node to the terminal, wherein, responsive to receiving the beam indicator in the response signal, the second paging data is transmitted in the detected beam.

8. The method of claim 7, wherein said beam indicator is associated with the detected beam in which the terminal received the first paging data, or with a detected beam in which the terminal has received a multibeam synchronization signal transmitted by the network node.

9. The method of claim 7, wherein the second paging data is transmitted in a dedicated beam determined by the received beam indicator.

10. The method of claim 7, wherein the feedback request indicator is determined based on a network load indicator.

11. The method of claim 7, comprising receiving a message from the terminal, which message includes data indicating a capability of the terminal to support beam reporting during paging.

12. The method of claim 7, wherein the response signal is received in a resource dedicated to the detected beam.

13. The method of claim 12, wherein uplink resources to accommodate multiple beams are allocated in time division multiplex TDM.

14. The method of claim 12, wherein uplink resources to accommodate multiple beams are allocated in frequency division multiplex FDM.

15. The method of claim 7, wherein the first paging data includes a wake-up signal for the terminal.

16. The method of claim 7, wherein said terminal identification information is associated with a terminal ID or a group ID.

17. The method of claim 7, comprising transmitting the first paging transmission at an instant determined based on at least one of said identification information, duration of a DRX cycle, and a paging frame number.

18. The method of claim 7, wherein said transmission in multiple beams is frequency division multiplexed FDM, wherein said first paging data is transmitted in a predetermined frequency index number associated with the terminal.

19. The method of claim 7, wherein said transmission in multiple beams is carried out in a beam sweep mode.

20. A terminal configured for communication with a network node, which network node is configured to send and receive data in a plurality of beams in a wireless communication system, the terminal comprising a transceiver, and a control unit including a processing device and a data memory holding computer program code, wherein the processing device is configured to execute the computer program code so that the control unit is configured to control the terminal to receive first paging data, the first paging data including a paging indicator transmitted in multiple beams from the network node;

determine a feedback request indicator in the received first paging data;

transmit a response signal from the terminal to the network node including, dependent on said feedback request indicator, a beam indicator associated with at least one beam in which the terminal has received data or a signal from said network node;

receive second paging data, including downlink control information associated with a paging message, from the network node to the terminal; wherein, responsive to sending a beam indicator in the response signal, the second paging data is received in a dedicated beam associated with said beam indicator.

* * * * *